United States Patent [19]

Winger et al.

[11] Patent Number: 4,541,696
[45] Date of Patent: Sep. 17, 1985

[54] EYEGLASS RETAINER

[76] Inventors: Irwin Winger, 102 W. Yale Loop, Irvine, Calif. 92714; Walter Friedopfer, 3225 Crystal Ct., Miami, Fla. 33133

[21] Appl. No.: 477,349

[22] Filed: Mar. 21, 1983

[51] Int. Cl.⁴ ............................................. G03B 21/04
[52] U.S. Cl. ...................................... 351/123; 351/156
[58] Field of Search ................ 351/122, 123, 156, 157

[56] References Cited

U.S. PATENT DOCUMENTS 3,684,356  8/1972  Bates ................................... 351/123
4,133,604  1/1979  Fuller .................................. 351/123

Primary Examiner—Rodney B. Bovernick
Attorney, Agent, or Firm—Leonard Tachner

[57] ABSTRACT

An eyeglass retainer comprising a tubular elastic knit cord made adjustable by sliding the temple pieces of eyeglasses into the tubular ends of the cord. The cord is a unitary piece.

1 Claim, 3 Drawing Figures

EYEGLASS RETAINER

BACKGROUND OF THE INVENTION

1. Field of the Invention

The present invention related to retainers for eyeglasses comprising bands that fit around the head of the eyeglass wearer and attach to the eyeglasses.

2. Prior Art

Various types of retainers for eyeglasses have been advanced which hold glasses through the use of a band or cord around the head of the user. These devices fall into either the category of those designed to retain the glasses in position around the user's neck, or into the category of those designed to retain the glasses in position upon the user's face.

U.S. Pat. No. 2,481,946 illustrates an eyeglass retainer utilizing a tubular member attached to a fabric strap to retain the glasses around the wearer's neck when the glasses are not being used.

Similar devices are shown in U.S. Pat. Nos. 2,704,961, 3,879,804, and 3,874,776.

U.S. Pat. No. 1,819,738 illustrates an eyeglass retainer comprising members that are designed to replace the normal ear supported temple or bow pieces of the glasses.

U.S. Pat. No. 3,450,467 illustrates an eyeglass retainer that attaches to the temple or bow pieces of the glasses.

U.S. Pat. No. 3,502,396 illustrates a non-stretch eyeglass retainer utilizing an adjustable fastener in the strap to adjust the fit of the eyeglasses to the head of the wearer.

U.S. Pat. No. 4,133,604 illustrates an eyeglass retainer comprising a strap constructed of a flat band of elastic material with open tubular members formed at either end, designed to slip over and grip the temple or bow pieces of the eyeglasses to be retained.

SUMMARY OF THE INVENTION

The present invention is an eyeglass retainer primarily for holding eyeglasses in position on the face of the wearer during use. However, the device may be adjusted and utilized to retain the glasses in place around the wearer's neck when the glasses are not being used.

The device comprises one piece of tubular elastic knit cord, the inside diameter of which is of suitable size to slip over the temple or bow pieces of eyeglasses, and the length of which is suitable to adjust the force of holding the eyeglasses by sliding the tubular knit cord along the temples to a desired position. The device is maintained in its adjusted position on the eyeglass temples by friction.

The device is simple, attractive, and efficient. The device lends itself to a one or two step manufacturing process which will allow the device to be provided at a low cost. Additionally, the device is very light weight and, when removed from the eyeglass, is easily coiled or folded to conveniently store in any pocket or purse.

When the retainer is in position it can be adjusted by the wearer to exert the desired amount of tension upon the eyeglasses rearwardly, thus retaining the glasses upon the face of the wearer securely and comfortably.

In the preferred form of the invention, the retainer will be a tubular elastic knit cord made on a circular string machine in a continuous fashion and then cut to the appropriate length. The material contents may be 600 denier 100% textured polyester knitted together with 400 denier clear 100% rubber, making the resulting tubular cord 60% polyesteer and 40% rubber. The ends of the cord, once cut, may be treated inside and out with clear vinyl by a process such as dipping. The vinyl coating will prevent fraying of the cord and increase the coefficient of the friction between the device and the temples of the eyeglasses when the device is used.

The device is placed around the wearer's head behind the ears, holding the eyeglasses in position under the desired tension. The device is especially useful to the wearer when engaged in work or recreational activities requiring physical movement such that non-retained eyeglasses could slip from their position on the user's face, thereby breaking the eyeglasses and possibly injuring the wearer.

DETAILED DESCRIPTION OF THE DRAWINGS

Figure 1:
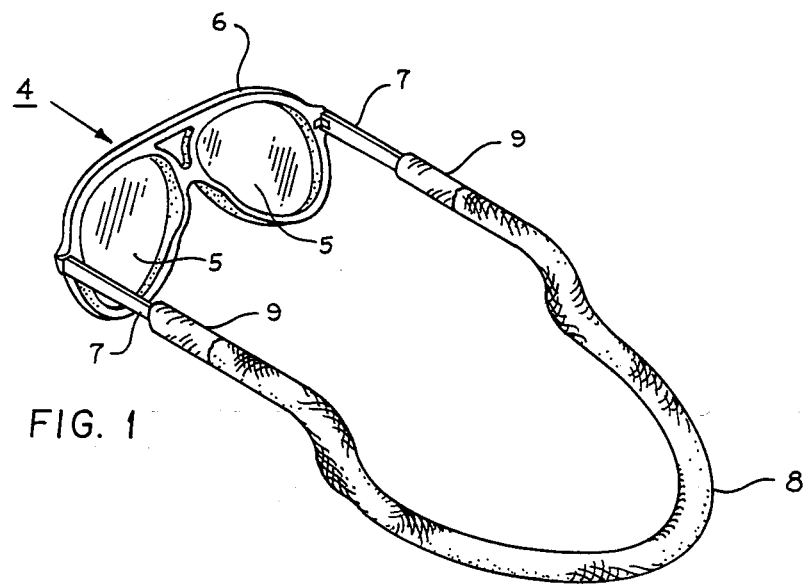
FIG. 1 is a perspective view illustrating a pair of eyeglasses having an eyeglass retainer according to the present invention installed thereon.

Referring to FIG. 1, a pair of eyeglasses as shown, has lenses 5, a main frame 6 for the lenses, and temple or bow pieces indicated generally at 7 attached to the main frame of the eyeglasses by hinges in the conventional manner. A retainer made according to the present invention illustrated at 8 is slipped onto the temple pieces 7 of the eyeglasses.

The eyeglass retainer 8 comprises a one-piece tubular elastic kit cord, the material inside and outside diameter of the cord being of uniform dimension for the entire length of the cord.

The eyeglass retainer 8 is utilized by slipping the ends of the tubular cord over the temple pieces 7 and adjusting the retainer for the desired tension around the wearer's head by sliding the ends of the tubular cord along the length of the temple pieces.

The quick and easy installations of the opposing ends of the tubular eyeglass retainer, which is comprised of only one piece and requires no mechanical fasteners over the respective temple pieces of a pair of eyeglasses, provides for easy adjustment, attractiveness, proven utility, and low cost.

Figure 2:
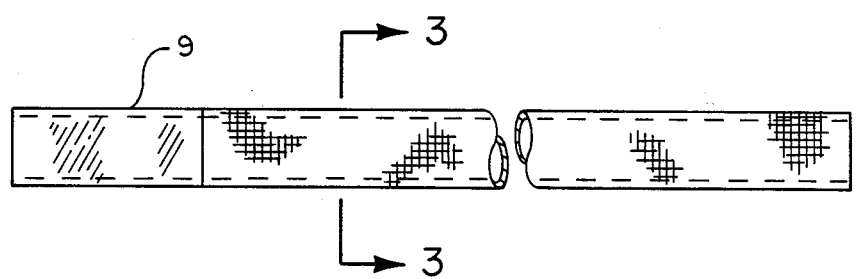
FIG. 2 is an enlarged fragmentary side view of an eyeglass retainer end position which slides over the temple pieces of eyeglasses as shown in FIG. 1.

Referring to FIG. 2, there is shown an enlarged fragmentary side view of an eyeglass retainer end portion indicating a coating of clear vinyl, 9, on the end of the eyeglass retainer.

Figure 3:
FIG. 3 is a sectional view drawn on line 3—3 of FIG. 2.

Referring to FIG. 3, there is shown a sectional view drawn on line 3—3 of FIG. 2 indicating the knitted tubular construction of the eyeglass retainer.

Changes in the details of construction can, of course, be resorted to without departing from the spirit of the invention, and it is accordingly the intention of the co-inventors that no limitations be implied and that the hereto annexed claims be given the broadest interpretation to which the employed language fairly admits.

The embodiments of the invention in which an exclusive property or privilege is claimed as defined as follows:

1. An improved eyeglass retainer of the type comprising an elastic knit material of suitable shape and diameter for securely engaging the side temples of eyeglasses and of suitable length to exert a resilient rearward force on eyeglasses when in place around the head of a wearer of such eyeglasses; the improvement wherein said retainer comprises a unitary elongated flexible tube of 100% textured polyester knitted together with 100% rubber in a combination having about 60% polyester and about 40% rubber, the end portions of said tube that are adapted to securely engage said eyeglass temples being internally coated with an adhered layer of vinyl whereby to increase the coefficient of friction and thus the relative engagement between said end portions and said temples.

* * * * *